E. E. CANNON.
CORN TOPPER.
APPLICATION FILED JAN. 6, 1913.
1,091,119.
Patented Mar. 24, 1914.
3 SHEETS—SHEET 1.
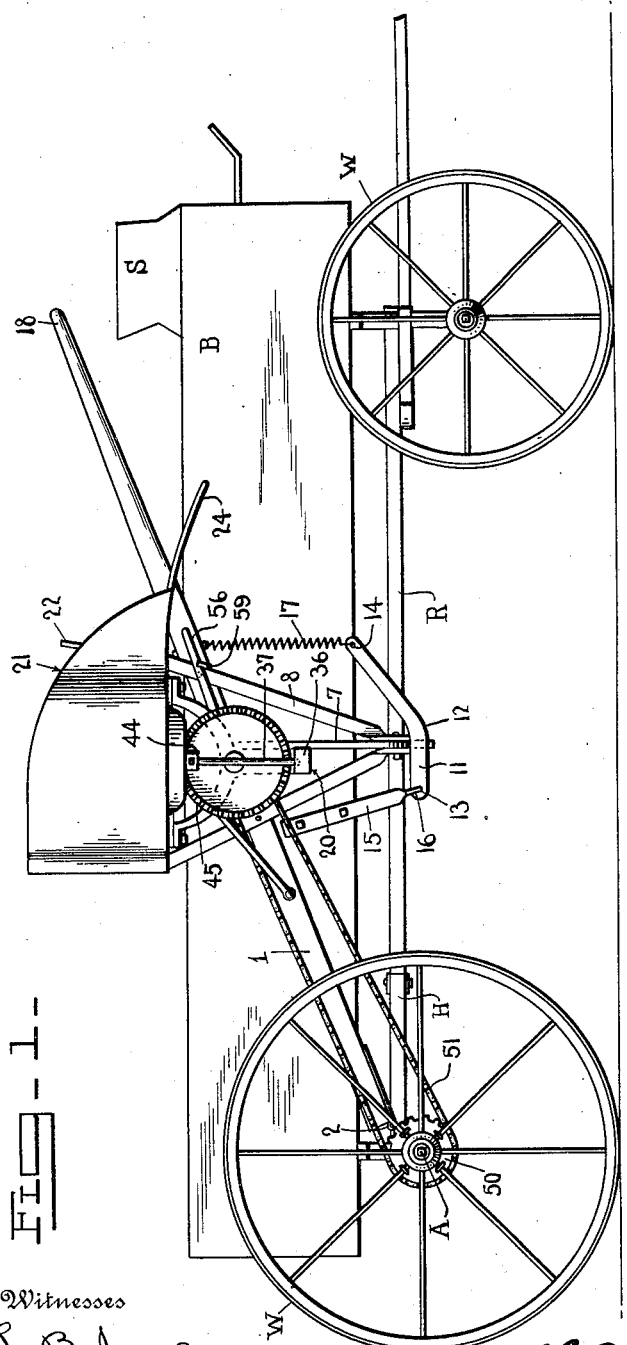
Inventor
Elmer E. Cannon

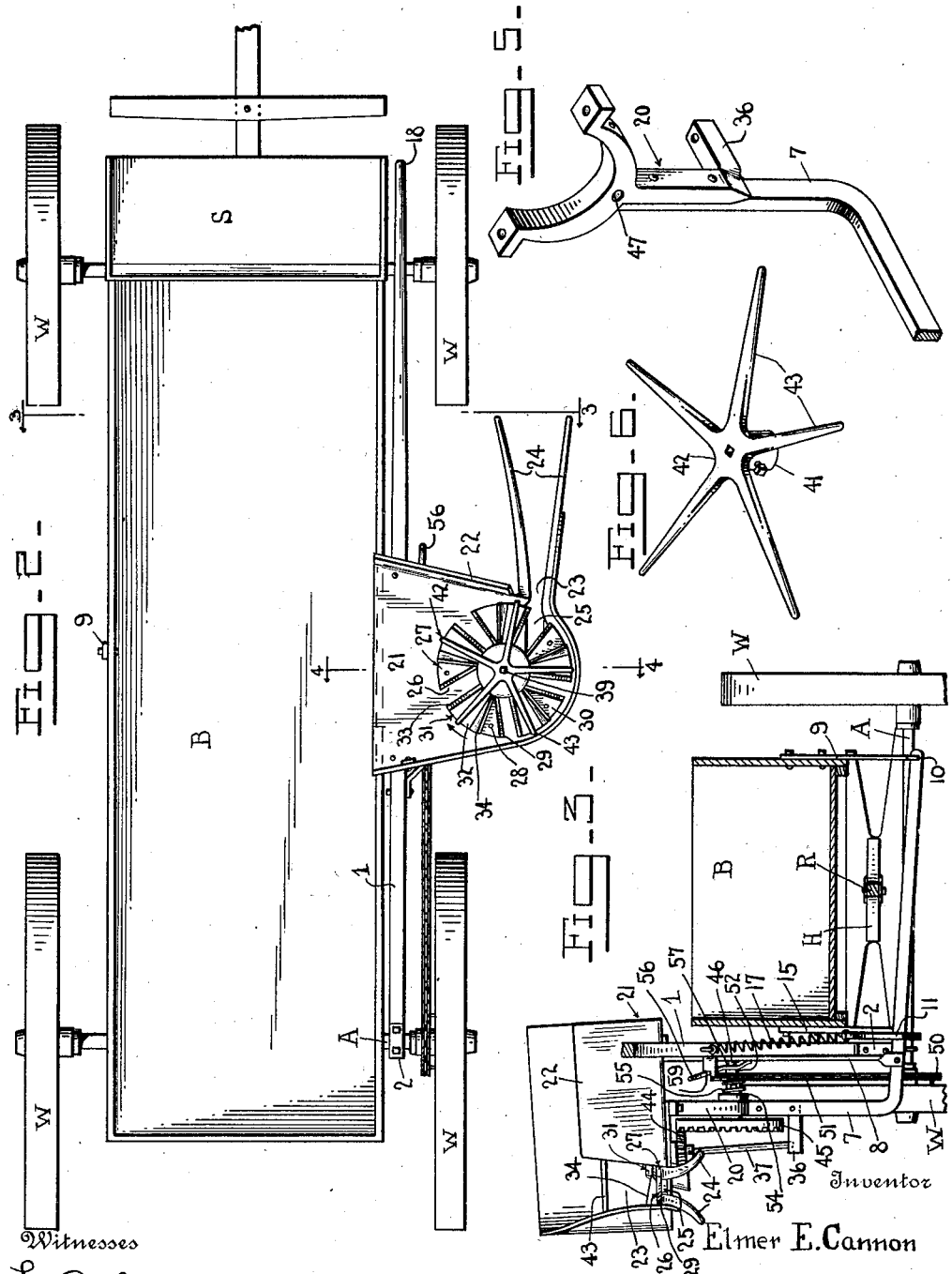

E. E. CANNON.
CORN TOPPER.
APPLICATION FILED JAN. 6, 1913.
1,091,119.
Patented Mar. 24, 1914.
3 SHEETS—SHEET 3.
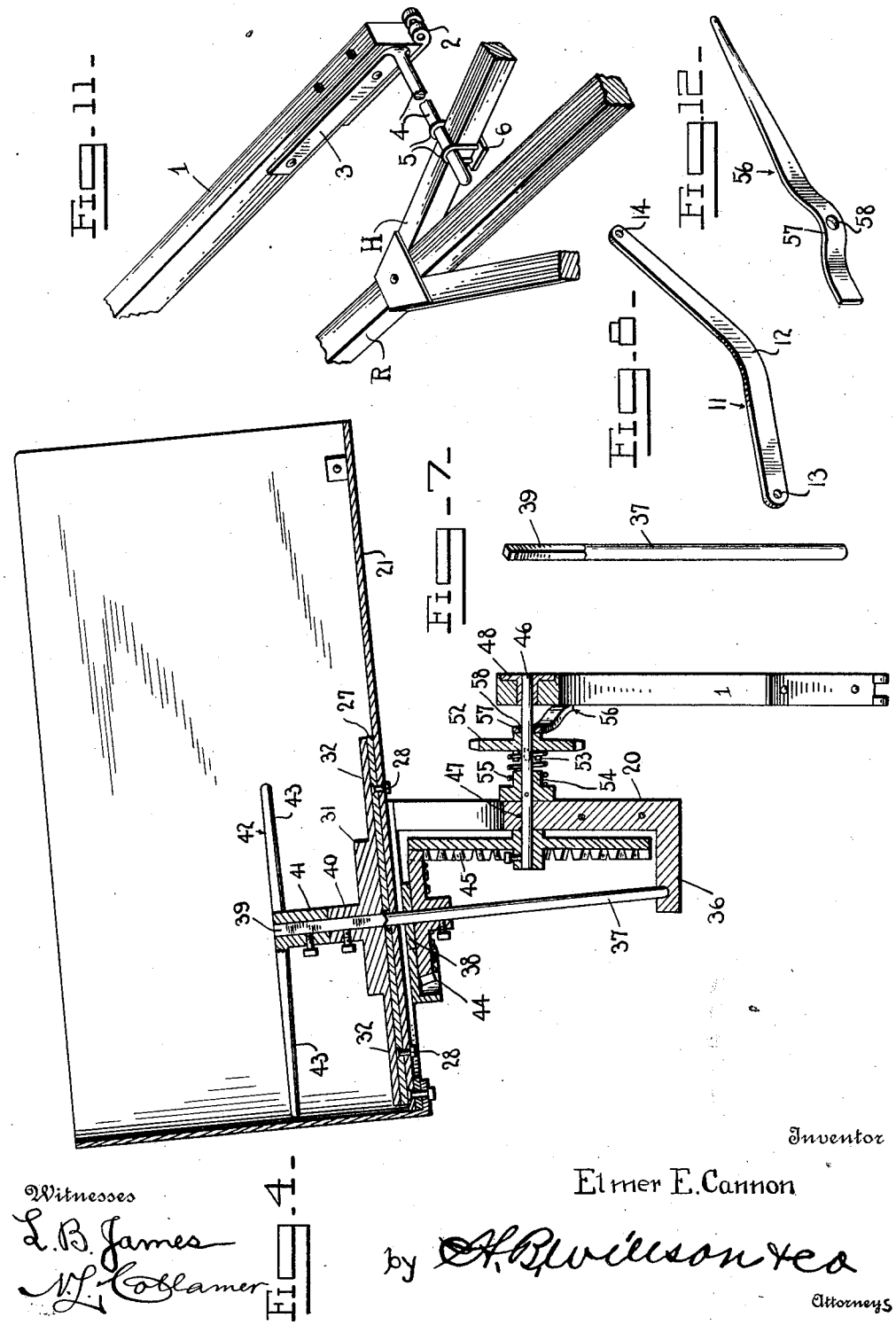
Witnesses
L. B. James
N. L. Collamer
Inventor
Elmer E. Cannon
by H. B. Willson & Co.
Attorneys

UNITED STATES PATENT OFFICE.

ELMER E. CANNON, OF WAUKOMIS, OKLAHOMA.

CORN-TOPPER.

1,091,119.  Specification of Letters Patent.  Patented Mar. 24, 1914.

Application filed January 6, 1913. Serial No. 740,490.

*To all whom it may concern:*

Be it known that I, ELMER E. CANNON, a citizen of the United States, residing at Waukomis, in the county of Garfield and State of Oklahoma, have invented certain new and useful Improvements in Corn-Toppers; and I do declare the following to be a full, clear, and exact description of the invention, such as will enable others skilled in the art to which it appertains to make and use the same.

This invention relates to harvesters, and more especially to those adapted for cutting the tops off of Kafir corn and the like; and the object of the same is to produce a portable machine of this character which may be attached to the box or body of an ordinary farm wagon and driven by a sprocket chain led from a driving sprocket secured to the hub of one of the rear wheels.

The invention consists in the specific details of construction hereinafter more fully described and claimed, and shown in the drawings wherein—

Figure 1 is a side elevation of a farm wagon equipped with this machine, and Fig. 2 a plan view thereof. Fig. 3 is a cross section on the line 3—3 of Fig. 2. Fig. 4 is an enlarged cross section through the pan, taken on about the line 4—4 of Fig. 2. Fig. 5 is a perspective detail of the casting at the upper end of the main frame. Fig. 6 is a perspective detail of the reel detached. Fig. 7 is a perspective detail of the upright shaft from which the reel is detached. Fig. 8 is a perspective detail of the supporting lever hereinafter referred to. Figs. 9 and 10 are perspective details respectively of the revolving knife and the stationary knife. Fig. 11 is a perspective detail of a different form of pivotal connection between the rear end of the main lever and the running gear of the wagon. Fig. 12 is a perspective detail of the clutch lever.

In the drawings I have shown my invention as applied to an ordinary farm wagon whereof we are concerned only with the box or body B mounted on bolsters connected by a reach R and hounds H, and W designates the wheels; and this wagon is to be drawn by a team of horses hitched thereto in the ordinary manner, and guided by the driver who sits on the seat S within reach of the handle or front end of the main lever. The latter, numbered 1, stands alongside the body B and is connected with the running gear in any suitable manner, as by means of a hinge 2, rather loosely connecting it with the rear axle A, or an L-shaped bracket 3 whereof one arm is secured to the main lever and the other is formed into a round finger 4 which passes loosely through the bends of clips 5 standing alongside one of the hounds H and held in place by a clip plate 6 as is the common practice. Either of these or any equivalent means for connecting the rear end of the main lever with the running gear will answer, and the ordinary position of parts is about that shown in Figs. 1 and 2.

The main framework is by preference composed of an L-shaped member 7 whose upright arm carries the casting best seen in Fig. 5 and whose horizontal arm extends transversely of and projects beneath the body or box B, and is rigidly connected with the main lever 1 by means of a V-shaped brace 8 which may well be of strap iron properly bent and riveted to these elements. Said horizontal arm of the lever 7 projects then inward beneath the box B, either above or beneath the reach R according to the height of the wagon, and is supported at its remote end by a strap metal support 9 which is bolted to the side of the box and has a hook or eye 10 at its lower end loosely engaging the inner end of said horizontal arm. The lever 7 is further supported near its angle and beneath the other side of the box or body B, by a lever 11 which is slightly bent between its ends as best seen at 12 in Fig. 8, and has eyes 13 and 14 in its extremities. The eye 13 in the rear end is sustained and supported by a strap metal support 15 screwed or bolted to this side of the wagon body as seen in Fig. 1 and having a hook or eye 16 in its lower end engaging said eye 13; and the front end of the lever 11 is connected with the main lever 1 by a coiled contractile spring 17 whose lower end engages said eye 14. From this structure it follows that the weight of the mechanism yet to be described, bearing downward on the brace 8 and the main framework 7, is communicated to the bend 12 of the lever 11, and by the latter is sustained on its pivotal support at the point 16 at its rear end and its yielding support which is the spring 17 at its front end. When the handle end 18 of the main lever 1 is raised and lowered by the operator sitting on the seat S, the spring 17 contracts and expands as the framework rises from the bent portion of the lever 11 or descends upon it and turns said lever around its pivotal support 16. I consider this one of the important features of the present invention, and am not aware of a machine of this character wherein the main lever is loosely connected at its rear end with the running gear, and the framework is pivotally connected at one side of the wagon box or body and is yieldably supported at its other side by a lever pivotally connected at one end to the wagon body and spring-supported at the other end by the main lever itself.

The casting 20 shown in Fig. 5 is secured to the upper arm of the L-shaped member 7 above described. Said casting is substantially Y-shaped in side elevation as shown in this view, and the arms of the Y support a pan 21 whose bottom inclines outward slightly away from the wagon body B as seen in Fig. 3, and stands about three or four inches above the upper edge of the body when the parts are in their normal working position, although dimensions are not essential to the present invention.

As seen in Fig. 2, the front end of the pan 21 is protected by a shield 22, leaving a mouth 23 open at a proper point to receive the corn stalks which are guided thereinto by guides or fingers 24 as usual. Just in rear of said mouth 23 the bottom of the pan is notched as at 25, the shape and size of this notch being the same as that of several (about five) similar notches 26 formed in the periphery of a stationary knife 27 (see Fig. 10) which is adjustably secured to the bottom of the pan by bolts 28. When the cutting edges 29 of the blades 30 of this knife become dull, it is bodily removed and replaced by another knife; but, with the construction shown, there is but one knife in use at a time, and when its cutting edge 29 becomes dull the bolts 28 are loosened and the knife given a one-fifth turn and the bolts reset. Mounted directly over the stationary knife 27 is a revolving knife 31, shown in Fig. 9 as having five blades 32 each with a cutting edge 33 at the front and an upturned wing 34 at its rear, and when this knife is rotated in the direction of the arrows in that view and in Fig. 2, the tops of the corn will be cut between the cutting edges 33 and 29 and will be delivered out of the pan 21 into the body B.

Mounted in a step bearing 36 which forms a part of the casting 20 is an upright shaft 37 which extends thence upward and is journaled in a bearing 38 carried by the bottom of the pan, above which it projects through the latter and is squared as shown at 39; and on this squared end is mounted the hub 40 of the revolving knife, and the hub 41 of a reel 42 best seen in Fig. 6, and whose arms 43 revolve in a plane above the cutting apparatus and deliver the tops of the corn into the wagon body in a manner above described. Said shaft 37 carries a bevel gear 44 driven by a crown gear 45 which is mounted on a driving shaft 46 journaled in a bearing 47 in the Y-shaped casting 20, and also journaled at its inner end in a bearing 48 which is by preference set into the main lever 1 as seen in Fig. 4. In the illustration herewith this driving shaft is connected with the hub of one of the wheels W as follows, but I do not wish to be limited to these details: A sprocket wheel 50 is secured to the hub of the wheel W or to its spokes in any suitable manner, and a chain 51 leads upward therefrom and over a driven sprocket 52 which is loose on the shaft 46. Said sprocket 52 has teeth on its outer face forming a clutch element 53 adapted to engage a similar element 54 fast on the shaft 46 but the elements are held out of engagement by an interposed expansive spring 55 as seen in Fig. 4. For throwing these elements into engagement the lever 56 shown in Fig. 12 is preferably employed, its rear end resting against one side of the main lever 1, its center having a bend 57 adjacent the inner side of the sprocket wheel 52 and here pierced with an eye through which the shaft 46 passes loosely, and its front end passing over a notched plate 59 secured to the main handle at about the juncture of the latter with the front arm of the brace 8, as seen in Figs. 1 and 3. When this lever stands in engagement with the notch in said plate 59 as shown in Fig. 3, the spring 55 is compressed and the clutch elements are in engagement, so that the rotation of the driving sprocket 52 turns the main shaft and with it the gears 45 and 44 and the rotary knife 31; but when the lever is disengaged from the notch the spring expands and throws the clutch elements 53 and 54 out of engagement as shown in Fig. 4, so that thereafter the progress of the wagon and rotation of its rear wheel will cause the driving sprocket 52 to rotate idly because the rotation of the shaft 46 has ceased.

In the main I have described most of the operation of this machine as the description of its construction progressed. It is quite obvious that it may be attached to almost any type of farm wagon by securing the supports 9 and 15 to the body B and the hinge 2 or finger 4 to the rear axle A or hound H at a proper point, and by attaching a sprocket 50 to the rear wheel W in any suitable manner and connecting it by a chain 51 with the sprocket 52 of the machine. The latter stands normally in about the relative position to the wagon body B that is shown in Fig. 3, and the tension of the spring 17 will ordinarily be about sufficient to sustain the machine in this position so that the operator riding with his hand resting idly on the handle 18 of the main lever 1, need neither raise nor lower it under ordinary conditions. If, however, the wagon should pass through a depresion in the earth's surface or a soft spot therein so that he feels himself traveling in a lower plane and realizes that he is cutting off too much of the tops of the corn, he can lift upon the handle 18 and the entire cutting apparatus is raised; similarly, if the wagon should pass over an obstruction or elevation, it may be necessary to depress the handle 18 so that the cutting apparatus is lowered. If the cutting edges 33 of the revolving knife 31 become dull, this knife can be bodily replaced by another. If the cutting edge 29 of that blade 30 of the stationary knife 27 which lies over the notch 25 in the bottom of the pan should become dull, the bolts 28 are removed and this knife given a one-fifth revolution; but in time this knife must also be replaced by one whose cutting edges are sharp. Therefore it may be wise to sell each machine with several knives of both types and an ample length of the chain 51 and both attachments 2 and 4 for hinging the rear end of the main lever to the running gear.

The parts of this device are mostly of metal, although doubtless the main lever will be of wood. It may be possible to make the machine in sizes especially adapted for certain shapes of farm wagons which are popular in the sections where Kafir corn grows most extensively.

What is claimed as new is:

1. In a topping machine of the class described, the combination with a wagon running gear and body, a main lever, means for connecting its rear end to said running gear, an L-shaped member having its upright arm connected with said lever and its horizontal arm passing beneath the wagon body, supports secured to the sides of said body, and connections between one of said supports and the inner end of the horizontal arm of said member; of a bent lever pivoted to the lower end of the other support with its bend passing under said member, a contractile spring connecting the forward end of this lever with said main lever, a pan carried by the main lever and having a notch in its front edge and an open mouth directed toward said wagon body, and the cutting apparatus within said pan.

2. In a topping machine of the class described, the combination with a wagon running gear and body, a main lever connected at its rear end to said running gear, an L-shaped member having its upright arm connected with said lever and its horizontal arm passing beneath the wagon body, supports secured to the sides of said body, and connections between one of said supports and the inner end of the horizontal arm of said member; of a bent lever pivoted at one end to the lower end of the other support with its bend passing under said member, and a contractile spring connecting the opposite end of this lever with said main lever, a pan carried by the main lever and having a notch in its front edge and an open mouth directed toward said wagon body, the cutting apparatus within said pan, a driving shaft therefor journaled through said main lever, a driving sprocket loose on said shaft, a sprocket on the rear wheel of said wagon, a chain belt connecting said sprockets and manually controlled clutch mechanism between said driving sprocket and cutting apparatus.

3. In a topping machine of the class described, the combination with a wagon, a main lever hingedly connected with the wagon, a V-shaped brace secured to and depending from said lever, an L-shaped member whose horizontal arm is secured to said brace, a support secured to the wagon body, a bent lever pivoted at one end to the support with its bend passing under the horizontal arm of said member, and a contractile spring connecting its other extremity with said main lever; of a Y-shaped casting carried by said member, a pan mounted on said casting and having a notch in its front edge and a mouth adapted to deliver into the wagon body, an upright shaft mounted in bearings in said Y-shaped casting and through the bottom of the pan, a rotary cutting mechanism mounted on the upper end of said shaft, and driving connections between the lower end of said shaft and the rear wagon wheel.

4. In a topping machine of the class described, the combination with a wagon, a main lever hingedly connected with the wagon, a V-shaped brace secured to and depending from said lever, an L-shaped member whose horizontal arm is secured to said brace, a bent lever pivoted at one end to the wagon body with its bend passing under the horizontal arm of said member, and a contractile spring connecting its other extremity with said main lever; of a Y-shaped casting carried by said member, a pan mounted on said casting and having a notch in its front edge and a mouth adapted to deliver into the wagon body, an upright shaft mounted in bearings in said Y-shaped casting and through the bottom of the pan, a rotary cutting mechanism mounted on the upper end of said shaft, a horizontal shaft journaled through said casting and in the main lever and driving connections between said shaft and the rear wagon wheel, and intermeshing gears on said upright and horizontal shafts, for the purpose set forth.

5. In a topping machine of the class described, the combination with a wagon running gear and body, a main lever hingedly connected at its rear end to said running gear, a brace depending from said lever, a supporting member connected with said lever and brace, a rock-lever having one end hingedly connected with the wagon body and its body standing beneath said member, and a spring connecting its other end with said main lever; of a pan carried by the latter and having a notch in its front edge and a mouth directed toward said wagon body, the cutting apparatus within the pan, a shaft journaled through said main lever and connected with said apparatus, a driving sprocket loose on the shaft, a sprocket on the rear wagon wheel, a chain belt connecting the sprockets and manually-controlled clutch mechanism between said driving sprocket and the cutting apparatus.

6. In a machine of the class described, the combination with a wagon, a support attached to said wagon, and a main lever hingedly connected with the rear axle of said wagon; of a pan having a notch in its front edge and an open mouth in its side directed toward said wagon body, the cutting mechanism within said pan, a member depending from the pan and having its lower end bent into a horizontal arm, a bent lever pivoted at its rear end to said support with its body passing under said horizontal arm, and an elastic connection between its front end and said main lever, for the purpose set forth.

In testimony whereof I have hereunto set my hand in presence of two subscribing witnesses.

ELMER E. CANNON.

Witnesses:
  MAX M. ROBBERTS,
  EARL R. LOVELL.

---

Copies of this patent may be obtained for five cents each, by addressing the "Commissioner of Patents, Washington, D. C."